(12) United States Patent
Nuriyev et al.

(10) Patent No.: US 7,609,671 B1
(45) Date of Patent: Oct. 27, 2009

(54) MULTI-USER SCHEDULING FOR OPTIMIZING TRANSMISSION OF DELAY SENSITIVE TRAFFIC

(75) Inventors: Rza Nuriyev, Dallas, TX (US); Ozcan Ozturk, Richardson, TX (US); Ashvin Chheda, Plano, TX (US); David Paranchych, Richardson, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 776 days.

(21) Appl. No.: 11/241,557

(22) Filed: Sep. 30, 2005

(51) Int. Cl.
*H04Q 7/00* (2006.01)
(52) U.S. Cl. .................................. 370/328
(58) Field of Classification Search ............. 370/328, 370/349, 335, 342, 389, 394, 412, 428, 429, 370/431, 441, 465, 474
See application file for complete search history.

(56) References Cited
U.S. PATENT DOCUMENTS

| | | | |
|---|---|---|---|
| 7,027,392 B2 * | 4/2006 | Holtzman et al. | 370/230 |
| 7,113,514 B2 * | 9/2006 | Tahernezhaadi et al. | 370/401 |
| 7,463,631 B2 * | 12/2008 | Bao et al. | 370/394 |
| 2004/0066763 A1 * | 4/2004 | Hashimoto et al. | 370/329 |
| 2004/0071146 A1 * | 4/2004 | Belling | 370/395.52 |
| 2005/0094675 A1 * | 5/2005 | Bhushan et al. | 370/527 |
| 2005/0281278 A1 * | 12/2005 | Black et al. | 370/412 |

OTHER PUBLICATIONS

STD-T64-C.S0024.V4.0, Oct. 2002, ARIB, pp. 1-560.*
cdma 2000 High Rate packet data air interface specification, 3GPP2, C.S0024, V. 4, Oct. 25, 2002, pp. 1-548.*
Nuriyev et al. Transmission Format Selection for Optimizing Transmission of Delay Sensitive Traffic, Sep. 30, 2005.

* cited by examiner

*Primary Examiner*—Dmitry Levitan

(57) ABSTRACT

A method, apparatus, and computer usable program code for creating a pseudo user from a plurality of users. Packets from the buffers are combined for the plurality of users into a buffer for the pseudo user. A multi-user packet is formed using packets from the pseudo user buffer, wherein the packets have older expiration times as compared to expiration times of other packets in the pseudo user buffer. The multi-user packet is transmitted to the mobile station.

17 Claims, 4 Drawing Sheets

| DRC INDEXES | MULTI-USER TRANSMISSION FORMATS | MULTI-USER LABEL | |
|---|---|---|---|
| | | | ← 500 |
| 0, 1, 2 | (NONE) | | ← 502 |
| 3, 4, 6 | (128,4,256)<br>(256,4,256)<br>(512,4,256)<br>(1024,4,256) | A | ← 504 |
| 5, 7, 9 | A + (2048,4,128) | B | ← 506 |
| 8, 11 | B + (3072,2,64) | C | ← 508 |
| 10, 12 | C + (4096,2,64) | D | ← 510 |
| 13, 14 | D + (5120,2,64) | E | ← 512 |

| DRC INDEXES | MULTI-USER TRANSMISSION FORMATS | MULTI-USER LABEL | |
|---|---|---|---|
| 0, 1, 2 | (NONE) | | ←500 / ←502 |
| 3, 4, 6 | (128,4,256)<br>(256,4,256)<br>(512,4,256)<br>(1024,4,256) | A | ←504 |
| 5, 7, 9 | A + (2048,4,128) | B | ←506 |
| 8, 11 | B + (3072,2,64) | C | ←508 |
| 10, 12 | C + (4096,2,64) | D | ←510 |
| 13, 14 | D + (5120,2,64) | E | ←512 |

MULTI-USER SCHEDULING FOR OPTIMIZING TRANSMISSION OF DELAY SENSITIVE TRAFFIC

1. FIELD OF THE INVENTION

The present invention relates generally to communications and in particular to a method and apparatus for transmitting data in a communications system. Still more particularly, the present invention relates to a method and apparatus for transmitting delay sensitive data in a communications system.

2. BACKGROUND OF THE INVENTION

In a wireless communications system many types of traffic are present. One type of traffic sent over a wireless communications system is data. Data is bursty by nature. Examples of data sent over a wireless communications system are e-mail messages and text messages. Delay sensitive traffic is a more common form of data sent over a wireless communications system. Voice communications is an example of delay sensitive traffic. The difference between voice and data is that voice is a real time application that has minimal tolerance for conditions such as delay or packet lost. As a result, voice traffic requires some minimum local of bandwidth to properly operate. In a communications system, voice is packetized. In other words, the conversation is digitized and encapsulated into a packet. These packets are transported across networks and transmitted to mobile stations.

Scheduling is employed to manage delay sensitive traffic in a wireless communications system. For delay sensitive traffic, the end-to-end delay should be within a certain bound to satisfy quality criteria dictated by quality of service requirements.

As a general rule in wireless communications systems, packets with a queuing delay at a transmitting station that exceeds a pre-determined amount of time are discarded. As a result, packet loss occurs, which eventually gives rise to user outage or, at the very least, reduced and/or unacceptable quality. The current scheduling systems are often unable to maintain the necessary quality of service needed to prevent gaps in conversations. Latency is the average time it takes for a packet to reach a destination from the source. The optimum amount of latency for a voice call is 100 milliseconds. Packet loss occurs when packets are dropped by the wireless communications system when too much latency is present for a packet. In the case of dropped voice packets, the packets are discarded and not retransmitted. Typically, voice traffic can tolerate less than a three percent loss of packets before callers experience disconcerting gaps in conversation. A one percent drop or less in voice packets is optimal.

Therefore, it would be advantageous to have an improved method, apparatus, and computer usable program code for scheduling the transmission of delay sensitive traffic to a mobile station.

SUMMARY OF THE INVENTION

The present invention provides a method, apparatus, and computer usable program code for creating a pseudo user from a plurality of users. Packets from the buffers are combined for the plurality of users into a buffer for the pseudo user. A multi-user packet is formed using packets from the pseudo user buffer, wherein the packets have older expiration times as compared to expiration times of other packets in the pseudo user buffer. The multi-user packet is transmitted to the mobile station.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
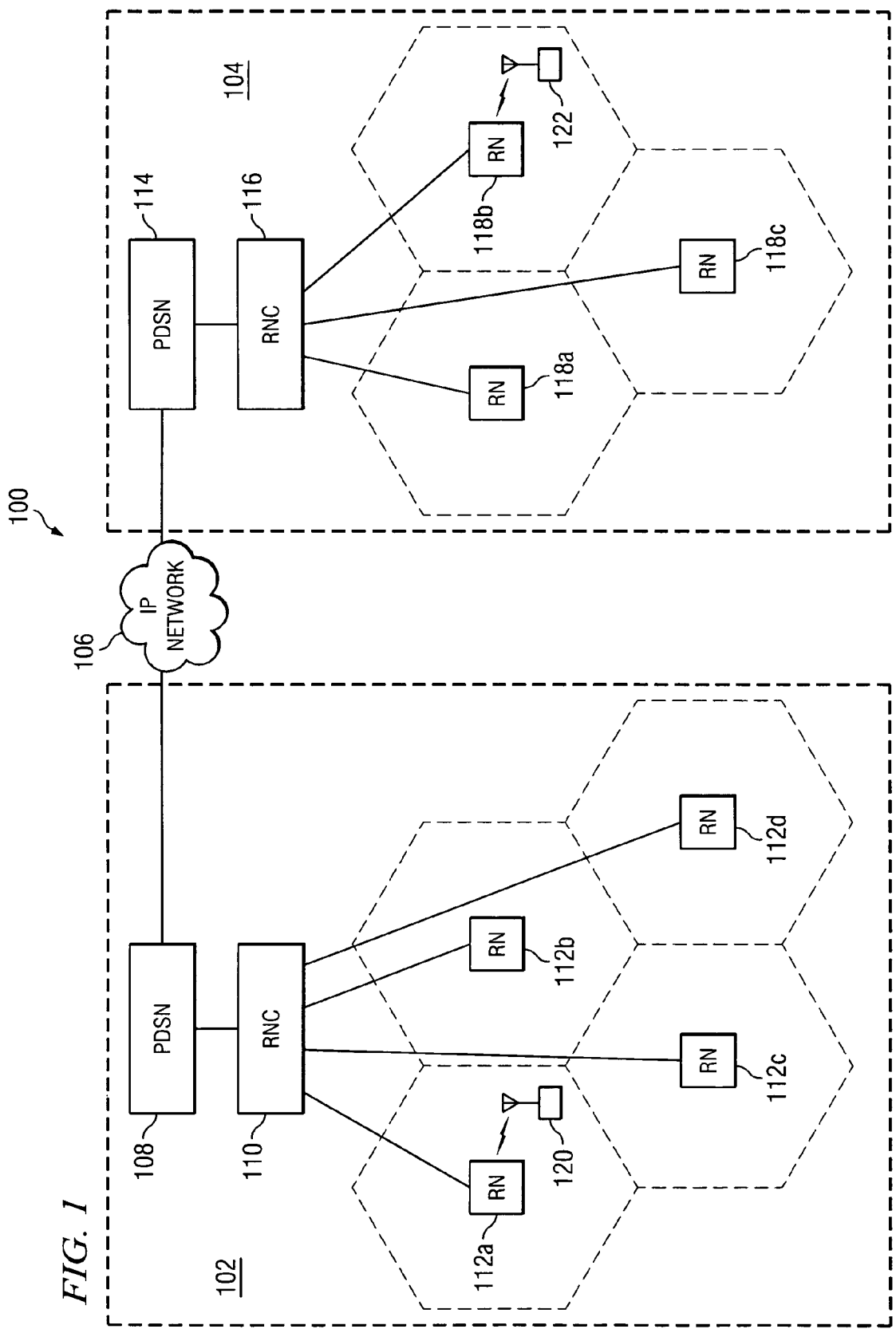
FIG. 1 is a communications system in accordance with an illustrative embodiment of the present invention.

With reference now to the figures and in particular with reference to FIG. 1, a communications system is depicted in accordance with an illustrative embodiment of the present invention. Communications system 100 is an example of a communications system in which the aspects of the present invention may be implemented. In this example, packet data communications system 100 includes wireless communications systems in the form of cellular system 102 and cellular system 104, each covering a different geographical region. Communications system 100 also is referred to as a "radio-telephone network". In the interest of clarity, FIG. 1 depicts only two such cellular systems. In addition, also depicted in communications system 100 is Internet Protocol (IP) network 106. Cellular systems 102 and 104 are CDMA wireless communications systems in the depicted example. Alternatively, other types of communications systems, such as, for example, an advanced mobile phone system (AMPS) or time division multiple access (TDMA) may be used in cellular system 102 or cellular system 104.

Packet data Cellular system 102 includes packet data serving node (PDSN) 108, radio network controller (RNC) 110 with a number of radio networks (RN) 112a-112d (a radio network is also referred to as a base transceiver station (BTS)). RNC 110 and associated RNs 112a-112d form a radio access network (RAN). Similarly, cellular system 104 includes PDSN 114, RNC 116 and RNs 118a-118c. RNC 116 and RNs 118a-118c also form a radio access network.

PDSN 108 and PDSN 114 are coupled to IP Network 106.

RNC 110 and RNC 116 function to locate mobile systems to the cell with the highest signal strength (handoff) and perform call setup, call supervision, and call termination. In addition, these RNCs perform remotely ordered equipment testing, updates, location information of mobile stations, and provide data transmission interfaces between itself and the PDSN.

RNs 112a-112d and RNs 118a-118c are cell site equipment used to communicate with mobile stations, such as mobile stations 120 and 122. These mobile stations are also called "mobile communications units" or "radiotelephones" and may be, for example, a cellular phone. A RN provides RF radiation transmission and reception with an appropriate channel access mechanism, such as, TDMA, CDMA, or AMPS. In addition, a RN provides voice and data transmission interfaces between itself and the RNC. A RN consists of several receive and transmit antennas, an RF distributor, modulators and demodulators, and T1/E1 trunkline interfaces for voice and data traffic. In CDMA systems, a global positioning system receive antenna also is included in the RN. FIG. 1 illustrates four source RNs (112a-112d) and three target RNs (118a-118c). Of course, other numbers of RNs may be employed for source and target systems. Additionally, in the depicted example, RNCs 110 and 116 are separate from PDSNs 108 and 114. Alternatively, PDSNs with integral controllers and routers may be employed according to the present invention.

When source mobile station 120 initiates a call, a determination is made as to whether the target system is a mobile station, such as mobile station 122 or a fixed station or land line station, such as a computer attached to IP network 106. The communications path extends from RN 112a to RNC 110 and from RNC 110 to PDSN 108. In turn, PDSN 108 establishes a communications path with IP network 106 to generate a communications path to the target mobile station.

The aspects of the present invention are particularly useful for transmitting delay sensitive traffic, such as voice over IP, real time video, and stock market data. The different aspects of the present invention focus on solving transmission system problems in handling delay sensitive traffic.

Currently available scheduling systems are primarily designed for throughput optimizations. Although throughput and delay are not completely independent, optimization of throughput does not necessarily translate into the reduction of delay. The aspects of the present invention reduce the amount of delay through a scheduler that selects a transmission format to reduce the delay in the queuing system. This type of process does not require changing priority processes.

Figure 2:
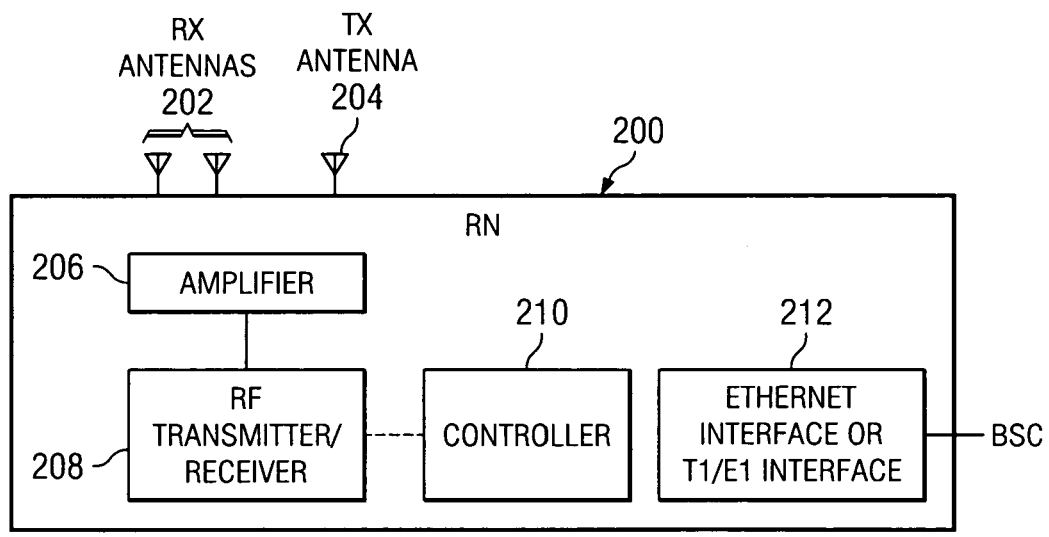
FIG. 2 is a functional block diagram of a base transceiver station in accordance with an illustrative embodiment of the present invention.

With reference now to FIG. 2, a functional block diagram of a radio network (RN) is depicted in accordance with an illustrative embodiment of the present invention. RN 200 includes receiver antennas 202 and transmitter antenna 204. RN 200 includes amplifier 206 used to amplify the signal for broadcasting in the forward link. Low noise amplifiers (LNA) are used to amplify the signal on the reverse link. RF transmitter/receiver 208 is located within BTS 200 and is employed to send signals to amplifier 206 to transmit antenna 204 with power amplifiers within amplifier 206 boosting the modulated signals to high power signals. RF transmitter/receiver 208 also is used to receive signals from mobile stations via receiver antennas 202 and amplifier 206.

Controller 210 is used to maintain an independent setup channel for shared use of the RN and communicating with all mobile stations within the zone or sector of the RN. Controller 210 may be implemented within a data processing system including components, such as, for example, a microprocessor, a memory, and a storage device. The microprocessor may be a digital signal processor (DSP) depending on the implementation. Controller 210 in the depicted example may be used to implement the RTD estimation functions of the present invention. Controller 210 within RN 200 includes functions, such as an overhead channel manager and a call resource manager to manage channels and various resources and processing calls from mobile stations. RN 200 also may include an Ethernet or T1/E1 trunkline interface 212 for voice and data traffic.

Figure 3:
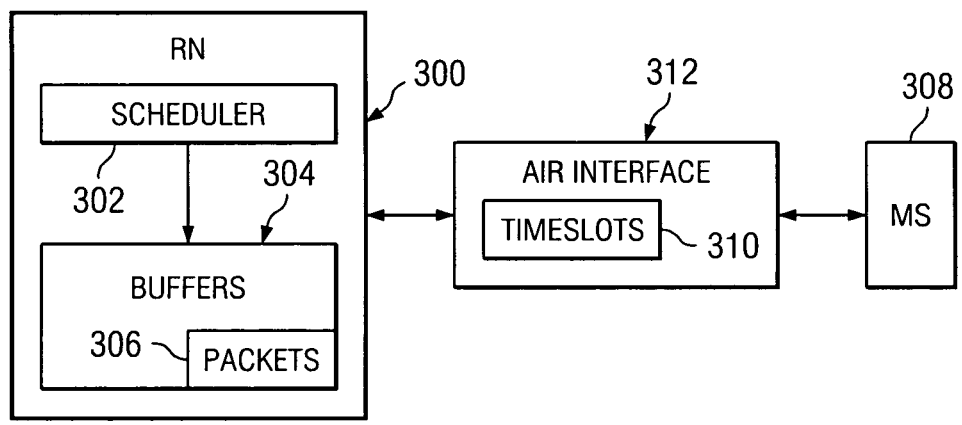
FIG. 3 is a diagram illustrating components used in reducing delay in the transmission of packets stored in queues or buffers in accordance with an illustrative embodiment of the present invention.

Turning now to FIG. 3, a diagram illustrating components used in reducing delay in the transmission of packets stored in queues or buffers is depicted in accordance with an illustrative embodiment of the present invention. In this example, base transceiver station 300 contains scheduler 302 and buffers 304. Scheduler 302 is a software process that is used to perform various functions to schedule the transmission of data. For example, scheduler 302 assigns priorities to users at every time slot. In other words, scheduler 302 chooses a user with maximum priority to transmit for a particular time slot. Further, scheduler 302 also identifies transmission formats for use in sending data to mobile stations in a forward link. The processes for scheduler 302 may be executed by a processor, such as a digital signal processor within base transceiver station 300. Buffers 304 serve as queues for traffic such as packets 306 located in buffers 304. In particular, scheduler 302 may be located in a base transceiver station such as base transceiver station 200 in FIG. 2. In this example, packets 306 are sent to mobile station 308 in time slots 310 over air interface 312. The aspects of the present invention maximize the transmission of packets 306 over time slots 310 to mobile station 308.

In these examples, packets are combined from multiple users into a single multi-user packet in a manner differently from those systems. Currently used systems typically form a multi-user packet only when the chosen user has insufficient data. The aspects of the present invention combine packets from multiple users into a single multi-user packet in a manner that treats each packet as a different stream. In combining the packets into a multi-user packet, the selection of packets involved are packets that have been in the buffer the longest for each user. In other words, packets are selected that are the oldest. These packets are packets that will be discarded before packets having younger or newer expiration times.

These packets are combined into a single payload per transmission over a time slot. Whether insufficient data is present for a particular user is irrelevant based on the aspects of the present invention for combining packets for multiple users into one multi-user packet. The grouping of these packets into a single packet is performed to send packets having an older expiration time to a mobile station before packets having a younger expiration time. In this manner, the likelihood that packets will be discarded is reduced.

In a forward link, the traffic is sent from base transceiver station 300 to mobile station 308 over air interface 312, mobile station 308 specifies a 4-bit integer called a data rate control (DRC) index for use in accessing the wireless communications system based on channel conditions. This forward link, as well as other transmissions, is implemented using Evolution Data Optimized (EV-DO) Revision A Standard (DORA). The formal name of this standard is 3GPP2 C.S0024 Version 4.0 CDMA2000 High Rate Packet Data Air Interface Specification. The data rate control index is set in DORA. This protocol is a wireless radio band data protocol in which data rate control indexes are specified by mobile stations for use by a base transceiver station in transmitting data over time slots to the mobile stations.

Figure 4:
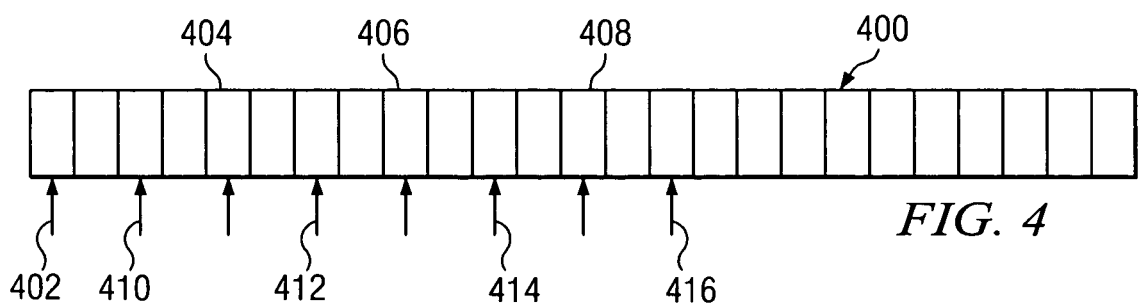
FIG. 4 is a diagram illustrating time slots in accordance with an illustrative embodiment of the present invention.

Turning now to FIG. 4, a diagram illustrating time slots is depicted in accordance with an illustrative embodiment of the present invention. Time slots 400 are examples of time slots within time slots 310 in FIG. 3. Time slots 400 are shown to illustrate interlacing in the transmission of data over time slots. For example, if data is to be sent over four time slots, the data will be sent in time slots 402, 404, 406, and 408. The data is sent only every four time slots in this example. The time slots in between these are reserved for other users and purposes.

The aspects of the present invention reduce the number of time slots needed to transmit the data. If a smaller amount of data is sent over a time slot, then the transmission may terminate after time slot 402 or time slot 404, rather than requiring the use of all four time slots transmission. When a mobile station receives data in a time slot, the mobile station begins decoding symbols in the data received in the time slot. This decoding of symbols is performed to reproduce the voice conversation in the transmission for the user. If the mobile station does not complete decoding the data, the data is sent again in a subsequent time slot to the mobile station. This resending of data continues for the number of time slots indicated by a transmission format.

For example, a transmission format may designate that the data is to be sent over four time slots. In other words, the data is repeated four times for that particular transmission format. With interlacing, the time taken actually requires additional time slots because the mobile station has to wait for its time slot because of interlacing in these examples. A hybrid automated repeat request system is implemented allowing the mobile station to terminate the transmission of data earlier if the decoding occurs at an earlier point in time.

In this example, data is transmitted to the mobile station at time slot 402. At that time, the mobile station begins decoding the symbols. If the mobile station does not finish decoding the symbols before it is time to transmit data in time slot 404, the data is again transmitted at time slot 404. The decoding continues and transmission of data may occur at time slots 406 and 408. By the time data is transmitted at time slot 408, the decoding should finish based on the transmission format identified from the data rate control index sent by the mobile station. By combining several packets from the beginning of the buffer for multiple users, all of these packets are more likely to be decoded prior to the packets being discarded. If packets are sent on a per user basis, the likelihood of packets from one of the users being discarded is greater based on the number of packets being sent for one user on one slot before the packets are sent for a user on another subsequent slot.

For example, if packets are sent for one user on time slot 402, those packets are again sent at time slots 404, 406, and 408 with the transmission format sending data over four time slots. If a second user has a priority that provides the sending of packets on time slots 410, 412, 414, and 416, a delay of two time slots prior to the sending of the packets for this particular user may result in packets being dropped for the second user. As an example, assume that the first packet in a buffer for the second user has been present in the buffer for 68 milliseconds. Packets are dropped after they have been in the buffer for more than 70 milliseconds in this example. If this first packet is sent over time slot 410 as a single user packet, this packet may be dropped before time slot 410 occurs for transmission. By combining this packet for the second user with the packet for the first user, the packet for the second user may be sent earlier in time slot 402, avoiding the dropping of this packet.

In general, multi-user transmission is used only if the scheduled user's data is insufficient to fill the entire frame of the corresponding transmission format, in which case the next highest priority users' data is used for augmentation purposes. For delay-sensitive traffic, a more advantageous approach to multi-user scheduling is present. The aspects of the present invention explicitly take into account delay criteria. For example, for Voice over IP (VoIP) traffic, the typical delay criteria is 100 milliseconds, that is the total transmission should take not more than 100 milliseconds from the start of transmission at the source.

The aspects of the present invention collect data from different users based on their individual packets rather than their entire buffers. To be more precise, given data rate control indexes of users, the packets are collected from the users based on their time in queue. That is, the aspects of the present invention try to schedule as many packets with "critical" expiration times in the multi-user packet as possible. Here, packets with critical expiration times refer to packets whose current delay in the queue is close to the delay bound set for that delay-sensitive application.

Figures 5, 6:
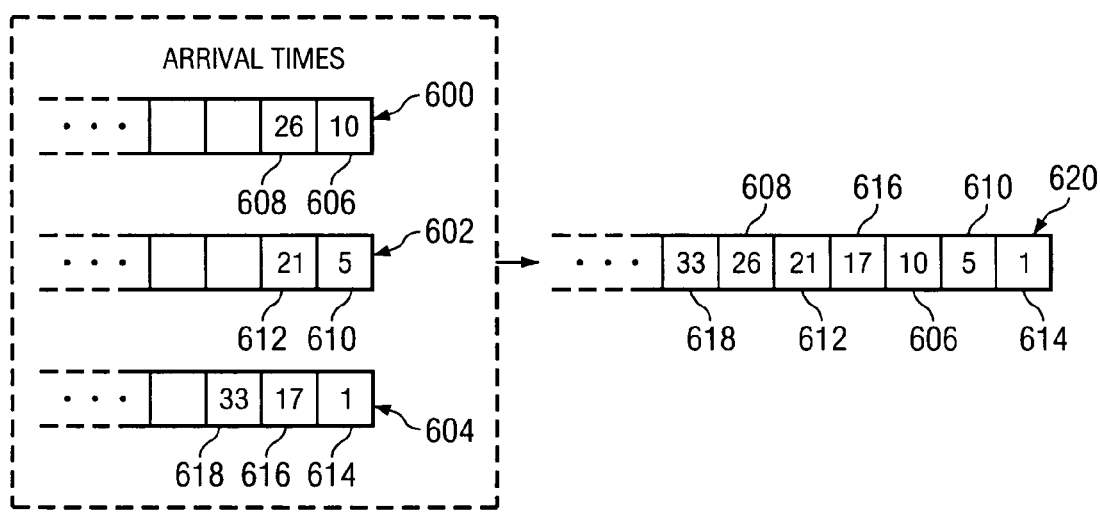
FIG. 5 is a diagram illustrating multi-user compatible data rate control indexes in accordance with an illustrative embodiment of the present invention.
FIG. 6 is a diagram illustrating combining of users into a single pseudo user in accordance with an illustrative embodiment of the present invention.

Turning now to FIG. 5, a diagram illustrating multi-user compatible data rate control indexes is depicted in accordance with an illustrative embodiment of the present invention. In this example, table 500 contains entries 502, 504, 506, 508, 510, and 512. Each of these entries defines a collection of supported multi-user transmission formats for a pseudo user.

Table 500 lists the multi-user compatible data rate control indexes together with the corresponding set of compatible transmission formats. As can be seen in table 500, three low rate data rate controls (0, 1 and 2) are present in entry 502 that do not support multi-user transmission, and the other twelve data rate controls (3-14) in entries 504, 506, 508, 510, and 512 are categorized into five different sets according to the collection of supported multi-user transmission formats. These sets are labeled by capital letters A through E in the increasing order of the number of supported transmission formats. These sets are nested such that set A is contained in B, which is contained in set C, etc. This setup implies that a user with the corresponding multi-user label can be downgraded to a multi-user transmission format corresponding to lower multi-user labels. These sets are also referred to as pseudo users in these illustrative examples. Also, data rate control ordering is not preserved with multi-user labels. For example, a data rate control index of 8 in entry 508 corresponds to a higher multi-user label than a data rate control index of 9 in entry 506.

In the case of multi-user transmission, the scheduler decides whether to use multi-user transmission in these examples. If multi-user transmission is selected, the scheduler chooses a set of users, the individual subsets of available packets, and the appropriate transmission format to use on the channel. Consequently, for scheduling purposes, differentiation among different, though not necessarily disjoint, sets of users is made, as well as, between the same set of users with different collections of individual packets. As an added complexity, users which are not compatible for the multi-user transmission at the current time may be present. Hence, a way to prioritize not only among different sets of users but also between multi-user and single user cases is employed.

With X being one of $\{A, B, C, D, E\}$, let $S(X)$ denote the set of users with multi-user label X or higher and let $P(X)$ denote the payload of canonical transmission format of the multi-user label ($T \times F$-s in bold in the second column of table 500 in FIG. 5). One can see that the following relationship is satisfied $S(A) \supseteq S(B) \supseteq S(C) \supseteq S(D) \supseteq S(E)$ $P(A) < P(B) < P(C) < P(D) < P(E)$ .1)

Assume that at least one of the sets S(X) has more than one member, and let $Y_1, Y_2 \ldots, Y_k$ denote the labels corresponding to distinct sets S(X) with more than one member (with the convention that higher labels take precedence, i.e. if S(B)=S(C), then C is chosen as one of the Y's). This way the strict ordering is:

$$S(Y_1) \supset S(Y_2) \supset \ldots S(Y_k)$$

$$P(Y_1) < P(Y_2) < \ldots P(Y_k) \qquad .2)$$

For each of these k sets of users, $S(Y_i)$, form a pseudo user whose buffer is a delay-sorted combination of individual buffers in that set and assign the corresponding payload $P(Y_i)$ as its current payload. The idea is for scheduler to treat these k pseudo users as ordinary users when assigning priorities, and thus combine several key decisions in one simple and backward-compatible (in terms of single user support) priority assignment process.

If a pseudo user happens to have the highest priority, and hence is selected by the scheduler, then the packets from the users in that particular set $S(Y_i)$, are fed into the multi-user transmission format with payload $P(Y_i)$, in the order that those packets were sorted when the corresponding buffers were combined. The combination of the packets into the buffer for the pseudo user resulted with the packet having the most delay being first in a buffer for selection. In other words, the packets that have been in the buffer the longest are selected first from the buffer for transmission as part of the multi-user transmission format. As a result, a payload may contain packets from a number of different users depending on the age of each packet.

If k is zero (that is all the sets S(X) have one member or none), ordinary single user scheduling is present. In the case of a nonzero k, the scheduler has only k additional (maximum of 5) priority assignments/evaluations to take care of in these examples.

Furthermore, if complexity becomes an issue, a further simplification may be performed. Since for any given (multi-user compatible) data rate control index, the payload sizes of multi-user and single-user canonical transmission formats are the same, users who are members of any of the sets S(X) may be excluded from considering them as single-user flows with minimal effect on performance. In fact, the only effect on performance will come from the fact that additional headers are associated with the multi-user packet generation. In this manner, the scheduler only has to prioritize k pseudo users and the users who correspond to lower data rate controls (0, 1 and 2).

While any priority function can be used in this process, some will perform better than others. The advantage of this depicted approach is that it reduces the problem of multi-user scheduling to a familiar problem of priority function design, and at the same time, is general enough to cover a large number of possible multi-user scheduling schemes. This approach can be further generalized by adopting different sorting criteria when combining different users' buffers. Delay is assumed to be the sorting criteria as the aspects of the present invention are concerned with the delay-sensitive traffic. Single-user priority functions may be modified to better suit the multi-user scheduling.

Turning now to FIG. 6, a diagram illustrating combining of users into a single pseudo user is depicted in accordance with an illustrative embodiment of the present invention. In this example, buffers 600, 602, and 604 are present for three different users. In this example, packets 606, 608, 610, 612, 614, 616, and 618 are illustrated with arrival times for purposes for describing the aspects of the present invention.

Packet 606 has an arrival time of 10 milliseconds, and packet 608 has an arrival time of 26 milliseconds in buffer 600. In buffer 602, packet 610 has an arrival time of 5 milliseconds and packet 612 has an arrival time of 21 milliseconds. Packet 614 has an arrival time of 1 millisecond, packet 616 has an arrival time of 17 milliseconds, and packet 618 has an arrival time of 33 milliseconds within buffer 604.

The aspects of the present invention in this illustrative example combine the packets from these three users to form a single pseudo user in which the packets are placed into buffer 620. These packets are placed into buffer 620 in an order in which the oldest packets are at the head of buffer 620.

Normally, one of the users is selected for priority to transmit packets in a time slot, such as time slots 400 in FIG. 4. For example, if a first user associated with buffer 600 has its packets sent in the first time slot, then packets 606 and 608 are the first packets sent in that time slot. If the packets for a second user associated with buffer 602 are sent in the subsequent time slot, then packets 610 and 612 are sent in the second time slot. Assuming that a third user associated with buffer 604 has its packets sent in the third time slot, then packets 614, 616, and 618 are sent in a third time slot. Based on the arrival time of these packets, packet 614 is sent after packets 608 and 612. If the current time is 69 milliseconds, then packet 614 is likely to be discarded before this packet is placed into a payload for transmission in a time slot.

The aspects of the present invention combine packets from the head of the line into buffer 620. The aspects of the present invention select packets for placement into buffer 620 based on how old the packets are. Packets are placed in buffer 620 such that packets that are to be discarded first are placed first for transmission. In other words, the age of the packet is used to determine where the packet is placed into buffer 620. As a result, older packets are placed first for transmission. The age of the packets is associated with the amount of time the packet has been present in the system.

Typically, the age of a packet should not be more than 100 milliseconds. The aspects of the present invention discard packets after packets have been in the buffer more than 70 milliseconds in these illustrative examples. As a result, if the pseudo user associated with buffer 620 has priority, then packets 614, 610, and 606 are placed into a payload in the first time slot. As a result, these packets are unlikely to be discarded before they are transmitted.

If the second user associated with buffer 602 is given priority, then the packets in buffer 600 and 604 are sent in later time slots. Based on the arrival times of packets 606 and 614, it is possible that these packets will be discarded before they are placed into payloads for transmission over a time slot. A similar result may occur if the third user associated with buffer 604 is selected with priority over the users. With packets 614 and 616 being sent in the upcoming time slot, packets 606 and 610 in buffers 600 and 602 have an increased likelihood that these packets will be discarded based on the arrival time of these packets. By using the aspects of the present invention to create pseudo users and transmit multi-user packets, these issues are reduced or eliminated.

According to the standard, there are several transmission formats (TxF) that correspond to the same data rate control index. These transmission formats only differ in the size of the payload, and the one with the highest payload is called a canonical transmission format. A transmission format (TxF) of the forward traffic channel is represented by an ordered triple of numbers (K, s, P), whose components are defined as follows: (1) physical layer packet size in bits or payload (K); (2) nominal transmit duration in the number of slots (s); and (3) preamble length in bits (P).

The physical layer packet size or payload is the total number of bits in the physical layer packet: {128, 256, 512, 1024, 2048, 3072, 4096, 5120}. The nominal transmit duration is the maximum number of time slots over which the physical layer packet is transmitted {1, 2, 4, 8, 16}. The number of chips of the packet preamble preceding the transmission of the packet is the number of chips of the packet preamble, which precedes the transmission of the packet {64, 128, 256, 512, 1024}. A chip is also referred to as a pulse with respect to transmission of data.

Because four-slot interlacing is used in these illustrative examples, a transmission format with nominal transmit duration of n time slots can actually take up to 4n–3 time slots to finish the transmission. Depending on the implementation, the interlacing may take place using other numbers of time slots other than four. Hybrid automatic repeated request (ARQ) allows for early termination, resulting in the higher final rate. For a TxF (K, s, P), K information bits are encoded, modulated, and spread into 1600*s-P chips over s time slots, which are transmitted with a three-slot interval between them. The first time slot carries 1600-P chips combined with P preamble chips, and the remaining s–1 time slots carry 1600 data chips each. The data rate of a transmission format is taken to be K/s (bits/time slot), and the nominal data rate of the data rate control index is taken to be the data rate of the corresponding canonical transmission format.

Figure 7:
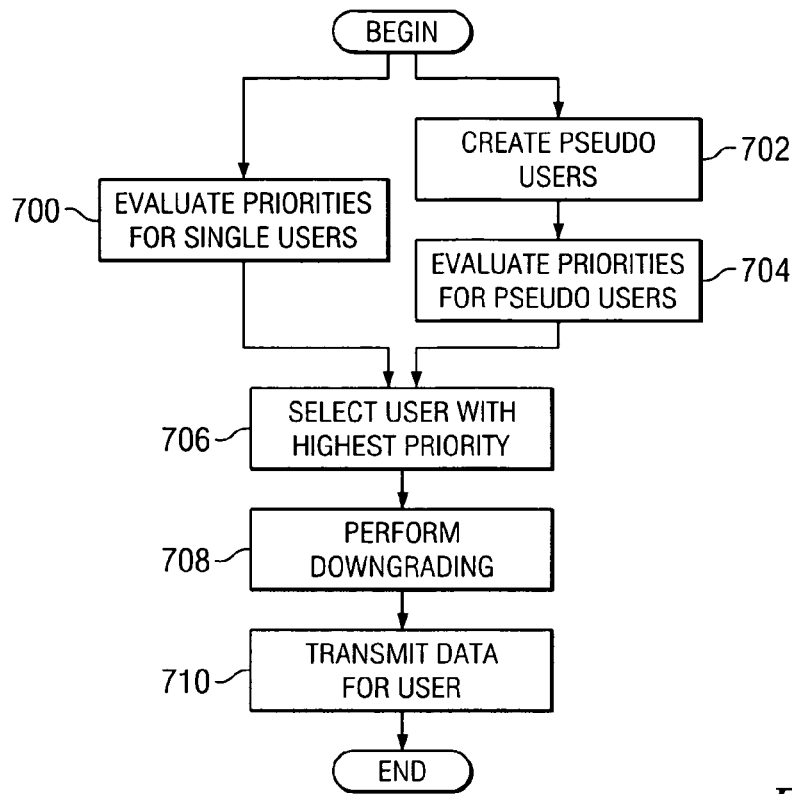
FIG. 7 is a flowchart of a process for sending data to a mobile station in accordance with an illustrative embodiment of the present invention.

Turning now to FIG. 7, a flowchart of a process for sending data to a mobile station is depicted in accordance with an illustrative embodiment of the present invention. The process illustrated in FIG. 7 may be implemented in a scheduler, such as scheduler 302 in FIG. 3.

The process begins by evaluating priorities for users (step 700). This priority is identified using the transmission format and an identification of the user. In these illustrative examples, the user is a user associated with a particular mobile station. The actual priority mechanism or algorithm used may vary depending on the particular implementation. At the same time in these illustrative examples, the process creates a set of pseudo users (step 702) and evaluates priorities for pseudo users (step 704). In step 702, pseudo users are created using a data structure, such as table 500 in FIG. 5. The different compatible formats are used in this process to determine whether a particular user may be placed into a set for a pseudo user. After the pseudo users are created, the priorities are evaluated in the same manner as those for single users in step 700.

Thereafter, the user with the highest priority is selected (step 706). Downgrading of the transmission format is performed for the selected user (step 708). This downgrading involves selecting a lower transmission format in a manner that allows for faster transmission of data as opposed to using a higher transmission format for a particular data rate control index. The process then transmits the data to the user (step 710) with the process terminating thereafter.

Figure 8:
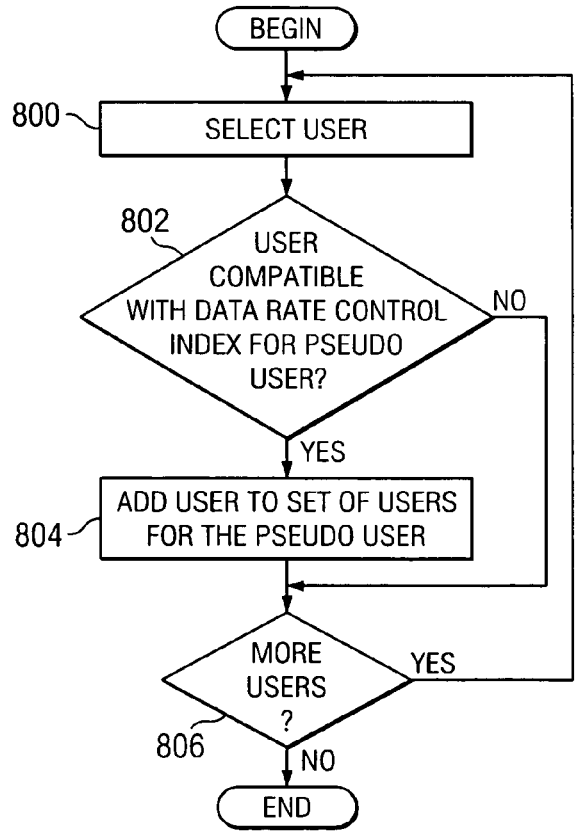
FIG. 8 is a flowchart of a process for creating a pseudo user in accordance with an illustrative embodiment of the present invention.

Turning next to FIG. 8, a flowchart of a process for creating a pseudo user is depicted in accordance with an illustrative embodiment of the present invention. The process illustrated in FIG. 8 may be implemented in a scheduler, such as scheduler 302 in FIG. 3.

The process begins by selecting a user (step 800). The user selected in step 800 is one that has not yet been processed. Next, a determination is made as to whether the selected user is compatible with the data rate control index for the pseudo user (step 802). The determination in step 802 is made using a data structure, such as table 500 in FIG. 5. For example, if the current pseudo user being created is pseudo user B, and the user has a data rate control index of 6, the user has a data rate control index that is compatible with the pseudo user. If the user has a data rate control index of 8, then this user is not compatible with pseudo user B in this example.

If the user is compatible with the data rate control index for the pseudo user, the user is added to the set of users for the pseudo user (step 804). A determination is then made as to whether additional users are present for processing (step 806). If additional users are present, the process returns to step 800 to select another user for processing. Otherwise, the process terminates. Referring back to step 802, if the selected user is not compatible with the data rate control index for the pseudo user, the process proceeds to step 806 as described above.

The process illustrated in FIG. 8 is performed for each pseudo user that is created. Note that in these examples five pseudo users are present. Of course, other numbers of pseudo users may be created depending on the particular implementation.

Figure 9:
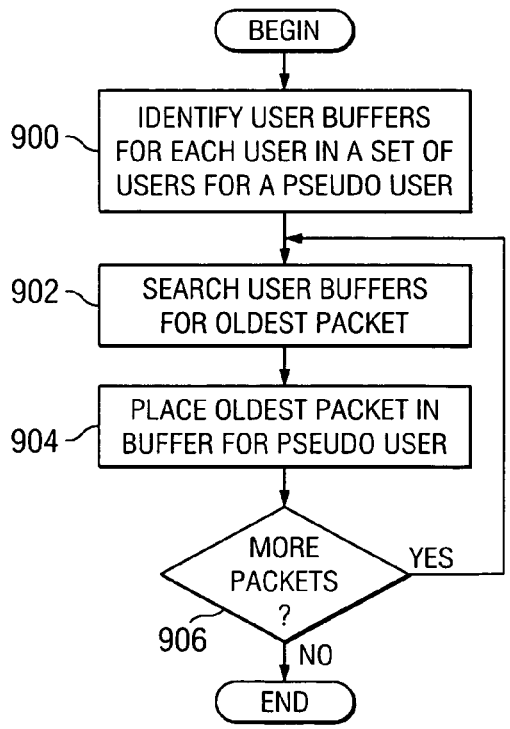
FIG. 9 is a flowchart of a process for combining packets from a set of users into a single buffer for a pseudo user in accordance with an illustrative embodiment of the present invention.

Turning next to FIG. 9, a flowchart of a process for combining packets from a set of users into a single buffer for a pseudo user is depicted in accordance with an illustrative embodiment of the present invention. The process illustrated in FIG. 9 may be implemented in a scheduler, such as scheduler 302 in FIG. 3.

The process begins by identifying user buffers for each user in a set of users for a pseudo user (step 900). Thereafter, the process searches the user buffers for the oldest packet (step 902). The oldest packet is placed into the buffer for the pseudo user (step 904). Thereafter, the process determines whether additional packets are present for processing in the user buffers (step 906). If additional packets are present, the process returns to step 902, otherwise the process terminates.

In this manner, packets may be selected from the buffers for the set of users associated with a pseudo user and placed into the buffer for the pseudo user in an order in which the oldest packets are at the head of the buffer. The older packets for the different users may be sent in a single multi-user transmission packet in a time slot. As a result, these older packets are likely to be transmitted in time slots and decoded prior to the packets being discarded.

Thus, the aspects of the present invention provide an improved method, apparatus, and computer usable program code for transmitting data to a mobile station. The aspects of the present invention reduce the likelihood that packets will be dropped. The aspects of the present invention create sets of users based on compatibility of data rate control indexes. Thereafter, the packets from these different users are combined in a manner to transmit the oldest packets first over time slots. This type of multi-user scheduling provides an increased probability that packets will not be dropped during transmission of the packets to a mobile station over time slots in a communications system.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. A method in a communications system for transmitting packets to a mobile station for a plurality of users, wherein each user is defined by a user data rate control index and wherein each user has an associated user buffer and each user buffer includes at least one user packet and each user packet has a determinable age, the method comprising:
   creating a plurality of pseudo users from the plurality of users by:
      selecting a plurality of pseudo users, wherein each of the plurality of pseudo users is defined by a pseudo user data rate control index and wherein each pseudo user has an associated pseudo user buffer;
      for each of the plurality of pseudo users adding at least two of the plurality of users to a set of users for the pseudo user if the user data rate control indexes of the at least two users are compatible with the pseudo user data rate control index; and
      for each of the plurality of pseudo users combining user packets from the user buffers for the set of users for the pseudo user into the pseudo user buffer for the pseudo user;
   forming a multi-user packet using packets from the pseudo user buffer of at least one of the plurality of pseudo users, wherein the packets in the multi-user packet have older expiration times as compared to expiration times of other packets in the pseudo user buffer; and
   transmitting the multi-user packet to the mobile station.

2. The method of claim 1, wherein adding at least two of the plurality of users to a set of users for the pseudo user if the user data rate control indexes of the at least two users are compatible with the pseudo user data rate control index is performed using a data structure defining associations between a plurality of pseudo users and data rate control indexes.

3. The method of claim 1, wherein combining user packets from the user buffers for the set of users for the pseudo user into the pseudo user buffer for the pseudo user comprises:
   placing packets in an order in which a first packet having the earlier arrival time in the user buffers is placed into the pseudo user buffer before a second packet having a later arrival time in the user buffers.

4. The method of claim 1 further comprising:
   assigning a priority to each of the plurality of pseudo users for use in determining which time slots are used to transmit the packets from the pseudo user buffer of at least one of the plurality of pseudo users to the mobile station.

5. The method of claim 1, wherein the age of a packet is measured by arrival times in the buffers.

6. The method of claim 1, wherein the creating, forming, and transmitting steps are performed in a base transceiver station.

7. The method of claim 1, wherein selecting a plurality of pseudo users includes selecting a plurality of pseudo users defined by nested pseudo user data rate control indexes such that all of the users in a set of users for a first one of the plurality of pseudo users are included in a set of users for a second one of the plurality of pseudo users but all of the users in the set of users for the second one of the plurality of pseudo users are not included in the set of users for the first one of the plurality of pseudo users.

8. A communications system comprising:
   a base transceiver station having a plurality of user buffers, wherein the user buffers are used to store user packets having a determinable age for a plurality of users having user data rate control indexes for transmission by the base transceiver station to a mobile station; and
   a scheduling module, wherein the scheduling module creates a plurality of pseudo users from the plurality of users by:
      selecting a plurality of pseudo users, wherein each of the plurality of pseudo users is defined by a pseudo user data rate control index and wherein each pseudo user has an associated pseudo user buffer;
      for each of the plurality of pseudo users adding at least two of the plurality of users to a set of users for the pseudo user if the user data rate control indexes of the at least two users are compatible with the pseudo user data rate control index; and
      for each of the plurality of pseudo users combining user packets from user buffers from the set of users for the pseudo user into a pseudo user buffer for the pseudo user to form a plurality of pseudo user packets;
   forms a multi-user packet using pseudo user packets from the pseudo user buffer of at least one of the plurality of pseudo users, wherein the packets in the multi-user packet have older expiration times as compared to expiration timers of other pseudo user packets in the pseudo user buffer; and initiates transmission of the multi-user packet by the base transceiver station to the mobile station.

9. The communications system or claim 8, wherein selecting a plurality of pseudo users includes selecting a plurality of pseudo users defined by nested pseudo user data rate control indexes such that all of the users in a set of users for a first one of the plurality of pseudo users are included in a set of users for a second one of the plurality of pseudo users but all of the users in the set of users for the second one of the plurality of pseudo users are not included in the set of users for the first one of the plurality of pseudo users.

10. A data processing system in a communications system for transmitting packets to a mobile station for a plurality of users, wherein each user is defined by a user data rate control index and wherein each user has an associated user buffer and each user buffer includes at least one user packet and each user packet has a determinable age, the data processing system comprising:

creating means for creating a plurality of pseudo users from a plurality of users by:

selecting a plurality of pseudo users, wherein each of the plurality of pseudo users is defined by a pseudo user data rate control index and wherein each pseudo user has an associated pseudo user buffer;

for each of the plurality of pseudo users adding at least two of the plurality of users to a set of users for the pseudo user if the user data rate control indexes of the at least two users are compatible with the pseudo user data rate control index; and for each of the plurality of pseudo users combining user packets from the user buffers for the set of users for the pseudo user into the pseudo user buffer for the pseudo user to form a plurality of pseudo user packets;

forming means for forming a multi-user packet using pseudo user packets from the pseudo user buffer of at least one of the plurality of pseudo users, wherein the packets in the multi-user packet have older expiration times as compared to expiration times of other pseudo user packets in the pseudo user buffer; and transmitting means for transmitting the multi-user packet to the mobile station.

11. The data processing system of claim 10, wherein the creating means comprises:

identifying means for identifying each of the at least two users from among the plurality of users having a user data rate control index associated with a pseudo user to form a first set of identified users for the pseudo user.

12. The data processing system of claim 11, wherein the identifying means is performed using a data structure defining associations between a plurality of pseudo users and data rate control indexes.

13. The data processing system of claim 10, wherein the creating means comprises:

placing means for placing user packets in the pseudo user buffer in an order in which a first packet having the earlier arrival time in the user buffers is placed into the pseudo user buffer before a second packet having a later arrival time in the user buffers.

14. The data processing system of claim 10 further comprising:

assigning means for assigning a priority to each of the plurality of pseudo users for use in determining which time slots are used to transmit the packets in the pseudo user buffer of at least one of the plurality of pseudo users to the mobile station.

15. The data processing system of claim 10, wherein the age of a packet is measured by arrival times in the buffers.

16. The data processing system of claim 10, wherein the creating, forming, and transmitting means are located in a base transceiver station.

17. The data processing system of claim 10, wherein selecting a plurality of pseudo users includes selecting a plurality of pseudo users defined by nested pseudo user data rate control indexes such that all of the users in a set of users for a first one of the plurality of pseudo users are included in a set of users for a second one of the plurality of pseudo users but all of the users in the set of users for the second one of the plurality of pseudo users are not included in the set of users for the first one of the plurality of pseudo users.

* * * * *

UNITED STATES PATENT AND TRADEMARK OFFICE
CERTIFICATE OF CORRECTION

| | | |
|---|---|---|
| PATENT NO. | : 7,609,671 B1 | Page 1 of 1 |
| APPLICATION NO. | : 11/241557 | |
| DATED | : October 27, 2009 | |
| INVENTOR(S) | : Nuriyev et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1062 days.

Signed and Sealed this

Twelfth Day of October, 2010

David J. Kappos
*Director of the United States Patent and Trademark Office*